DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1363

T889,006
DRY PRINTOUT SYSTEM FOR PAPER

William J. Priest, Kodak Park Works, 1669 Lake Ave., Rochester, N.Y. 14615

Filed Apr. 30, 1970, Ser. No. 33,503
Int. Cl. G03c *1/58, 5/22, 5/34*
U.S. Cl. 96—49
No Drawing. 17 Pages Specification

Stable photographic images are formed by a dry printout process which employs a photographic element comprising a light sensitive compound, e.g. an aromatic azide, and a dye forming coupler, preferably a phenolic compound of the type which will form an azomethine dye. The azide and the coupler are preferably coated on a support such as paper and isolated from each other. The element is exposed image-wise to visible light at ambient temperature whereby the photosensitive component decomposes to a colored photoproduct in the light struck areas. The element is then heated to permit intimate physical mixing or cosolution of the light sensitive and coupler components and then flash exposed at a different temperature to yield stable printout images directly without additional processing or fixing steps. The system may be made either positive or negative working by reversing the temperatures at which the exposures are made.

Suitable azides include 3-methyl-4-azido-N-ethyl-N-dodecylaniline and N-(4-azidophenyl) morpholine; and suitable couplers include 2,4-dichloro - 3 - methyl-6-stearamidophenol and 2-[α-(2,4-di - tert - amylphenoxy) acetamido]-4,6-dichloro-5-methylphenol. The azide and the coupler are preferably coated in separate layers on the support and are non-migrating at normal temperature but when heated they mix and upon light exposure form a dye.